April 17, 1945. W. M. EMERY 2,373,665
PORTABLE INTERMITTENT CLUTCH TOOL
Filed Feb. 11, 1943
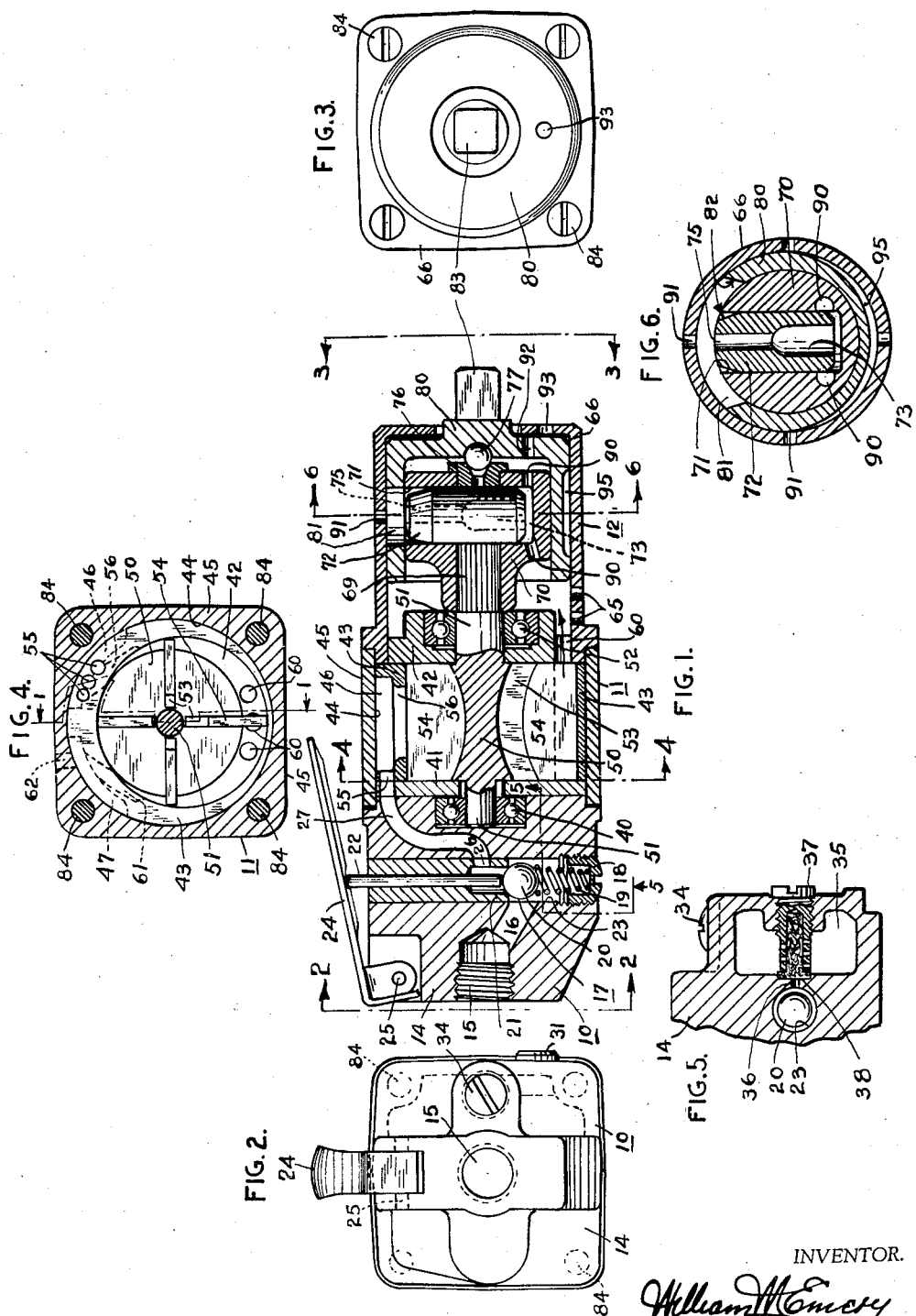
INVENTOR.
William M. Emery Patented Apr. 17, 1945

2,373,665

UNITED STATES PATENT OFFICE 2,373,665

PORTABLE INTERMITTENT CLUTCH TOOL

William M. Emery, Shaker Heights, Ohio, assignor to Rotor Tool Company, a corporation of Ohio Application February 11, 1943, Serial No. 475,517

12 Claims. (Cl. 192—30.5)

This invention relates to improvements in tools and intermittent impact producing clutches for running nuts, screws, studs and the like, or any application where it is desirable to multiply the normal torque of the tool by the use of impact or forces incident to the sudden deceleration of revolving parts.

This invention is an extension of the inventive concept described in my copending application #423,320, filed December 17, 1941, and many of the same mechanical principles and objects, set forth therein apply to this invention.

Weight and size is a very important factor in such tools and clutches, and in an effort to provide a tool of minimum size to do a maximum job the forces of impact are concentrated on parts of limited area and size. This increases the concentration of heat resulting from repeated impact blows to a point that is detrimental to the wear resisting properties of these parts even though they are made of special alloy steels. Likewise, it is important to lubricate these surfaces. Grease reduces the efficiency of these clutches due to its viscosity and the high speed of the parts and a reservoir of liquid oil cannot be satisfactorily retained in the clutch itself because of its jointed construction. My invention lubricates them with liquid oil without a reservoir in the clutch. An air motor is best lubricated by lubricating the compressed air which operates and passes through it. When this is done, the excess oil is thrown from the motor exhaust. This is not only wasteful but objectionable in many cases. By using the lubricated exhaust air to lubricate my clutch, I secure the benefits of liquid lubrication without the drag of grease. I hold and condense much of the oil which would be otherwise thrown by the exhaust and use it advantageously thereby reducing the excess oil to which the operators often object.

The air is exhausted from the motor while still under some compression, such as about 20 lbs. per square inch. This air has just expanded from the 90 lbs. pressure of the inlet so that it is quite cold and when further expansion is allowed in or adjacent to the clutch and the impact parts, these parts are cooled thereby or may be even substantially refrigerated. The lowering of the temperature of the air as well as its pressure not only cools the parts prolonging their life but tends to cause the lubricant in the compressed air to separate out and be caught by the clutch parts which acts to catch and separate the excess oil from the fluid power before it reenters the atmosphere or is blown onto the operator, to his intense annoyance.

If compressed air is passed continuously over the clutch the temperature might be reduced unnecessarily but since I use the exhaust air it is obvious that in ordinary use the amount of air passed through the clutch will be proportioned to the amount of work done by the clutch and the heat generated incident thereto. For example, if the tool is throttled down for lighter nut setting the amount of air passing over the clutch will be reduced which would be substantially proportional to the less heat generated in setting smaller nuts.

In the embodiment shown the clutch is revolved by a pneumatic motor. My novel clutch is not limited, however, to use with a pneumatic drive, although such a motor has certain advantages for impact work.

Accordingly objects of my invention are to provide tools and clutches of the class described having:

1. Less weight in proportion to their power.
2. Less maintenance, and more durability, especially of the impact surfaces.
3. Freedom from overheating because of air cooling.
4. Means to utilize the refrigerating qualities of compressed air to cool the clutch and also do this in substantial proportion to the heat generated and work done by the clutch.
5. Better lubrication of the clutch.
6. Greater efficiency from better liquid lubrication without using greases which are more sensitive to temperature change and tend to drag especially when the parts are operating at high speed.
7. Greater simplicity of construction with a minimum number of operating parts.
8. Means operative to separate out the excess oil in the compressed air or other fluid media and thereby reduce the quantity of lubricant exhausted into the air or elsewhere.
9. Compressed air means to expedite or at least impart to supply forces effect movement of the engaging clutch part or parts.

Additional objects and novel features of my construction are obvious from the foregoing discussion and will be apparent from the following specifications when considered together with the accompanying drawing in which:

Fig. 1 is a sectional view of an embodiment of my invention substantially on the axis of the tool.

Fig. 2 is an end elevation of the embodiment shown in Fig. 1 as indicated thereon by line 2—2.

Fig. 3 is an end elevation of the same embodiment as indicated by line 3—3 in Fig. 1.

Fig. 4 is a sectional view, cut substantially on line 4—4 of Fig. 1.

Fig. 5 is a sectional view, cut substantially on line 5—5 of Fig. 1.

Fig. 6 is a sectional view cut substantially on line 6—6 of Fig. 1.

To illustrate an application of my invention, I have selected as shown in the drawing a tool that would be known in the trade as a pneumatic driven impact nut setter, although it has a variety of uses. Generally speaking, it is composed of a head member 10, a motor 11, and an impact clutch 12.

Compressed air customarily with a pressure of 85 to 100 lbs. per square inch enters the head casting 14 through a threaded inlet 15 passing through an angular passage 16 to the ball throttle valve 17 consisting of a plug 18, a spring 19, a ball 20, a ball seat 21, a push rod 22, all located in a transverse bore 23 in the head casting 14, and a finger lever 24, pivoted to head casting at 25 to depress the push rod 22.

When the ball 20 is pushed away from its seat 21 the compressed air passes around the ball into the drilled end of the seat 21 and through a transverse hole 26 therein and through a passage 27.

Fig. 5 shows an oil reservoir 35 in the head casting 14, filled through a hole plugged by the screw 34. Port 36 connects the reservoir 35 with the bore 23 in front of the ball 20. A threaded plug 37 is hollowed on one end, the side wall of the hollow portion is perforated. The hollow is filled with felt 38 which is pressed against port 36. The compressed air seeps into the oil reservoir through felt 38 and equalizes the air pressure therein with that of the inlet 15 generally called the line pressure. Any reduction from this pressure will cause the oil carried by returning equalizing air from the reservoir 35 to seep back through the felt 38 which is saturated with lubricant. The air stream passing through the hole 36 to ball valve 17 picks up this lubricant. Operating the throttle lever 24 will usually cause sufficient change in pressure to effect a seepage of lubricant into the air stream. Ball bearing 40 is seated in the head casting 14.

The motor 11 includes two hardened end plates 41 and 42, and eccentrically bored cylinder 43 pressed into the concentric bore 44 of housing 45, two chambers or recesses 46 and 47 formed in the thicker wall of the eccentric cylinder 43 in conjunction with the bore 44, and a rotor 50 with an integral shaft 51. The rotor 50 is mounted in ball bearing 40 and 52 concentric with housing bore 44 but eccentric relative to the bore of cylinder 43. Four slots 53 are cut in the rotor 50 and a blade vane or abutment 54 as they are variously called is mounted in each slot. The blades contact with the interior walls of the bored cylinder 43 under centrifugal forces when the rotor revolves and divide the crescent shaped space formed by the eccentricity of the cylinder into four chambers. The rotor 43 is in practical seal with the bore of cylinder 43 there being a clearance of about .001 or .003 of an inch usually sealed with lubricant. Likewise, the end plates 41 and 42 are in practical seal with the ends of the rotor 50.

Air passage 27 is continued from the head casting 14 through the end plate 41 through ports 55 of the cylinder 43 into the recess 46 and thence through port 56 into the bore of the cylinder 43 to press against blades 54 to revolve the motor clockwise as shown in Fig. 4.

Two exhaust ports 60 and 61 are provided. Major exhaust port 60 is in the end plate 42 and the second port 61 is in the interior wall of the bore in cylinder 43 and extends into recess 47. Recess 47 exhausts into the atmosphere through a hole 62 in the housing 45.

The end plate 42 seats the ball bearing 52 and separates the clutch portion 12 of the tool from the motor portion 11 except that exhaust port 60 interconnects them so that the lubricated exhaust air from the motor which is still under some compression such as 20 pounds per square inch flows through the clutch as will hereinafter be described to cool and lubricate it. Since the compressed air has just expanded such as from 90 pounds pressure to 20 pounds it has become very cold and since it is still somewhat compressed its temperature can further be reduced by expansion. Supplemental exhaust ports 65 are in the clutch housing 66 to by pass exhaust air not necessary for cooling the clutch 12.

The end of the rotor shaft 51 nearest the clutch 12 is splined as at 69. A hammer member 70 is rotated by the spline. A transverse blind bore 71 in the hammer 70 mounts a bolt or intermediate member 72 which is free to move outward under centrifugal forces and free to turn on its axis within the bore 71. The outer end of bolt 72 is slightly chamfered to form a cam surface. The inner end is drilled or hollowed out to form a walled recess 73 to lighten the weight of this end of the bolt 72 to move its center of gyration away from the axis of rotation of the hammer to make it more responsive to centrifugal forces. Hole 75 is also drilled in bolt 72 for cooling and other purposes.

To allow for easy broaching of the spline 69 in the hammer, the hammer 70 is axially drilled but this drilled hole is later closed by plug 76 which carries a ball 77 for a thrust bearing.

An anvil 80 as more fully described in my copending application previously mentioned, is cylindrical in shape with a blind bore in which the hammer member 70 is loosely journaled. A hole 81 is angularly elongated through the tubular portion of anvil 80 in alignment with the bore 71 in hammer 70 and the bolt 72 mounted therein. The elongated ends of hole 81 have substantially the tapered shape of the chamfered or cam end of bolt 72. When bolt 72 moves outward under centrifugal forces the cammed or chamfered end of bolt 72 strikes an impact blow against one end of hole 81. The surfaces giving and receiving the blow I call impact surfaces 82. Since bolt 72 can turn in its blind bore 71 any section of its chamfered or cammed portion may act as an impact surface thus distributing the wear. The function of the chamfered or cammed impact surfaces is to cause the return of the bolt 72 into the transverse bore 71 after each impact blow.

On the other end of anvil 80 is a squared axial projection 83 to which can be attached various types of tools such as a nut socket or screw driver.

The clutch housing 66 encloses the clutch and prevents the bolt 72 from moving or coming far out of the hammer 70 or too far through the hole 81 in anvil 80. It also functions to keep the clutch parts in their proper axial position.

The whole tool is held together by four through bolts 84 which pass through the clutch housing 66, the motor housing 45, the end plate 41 and 42 and are tapped into the head casting 14.

The still partially compressed air which has been lubricated as previously described enters the clutch housing 66 by exhaust port 60 in end plate 42. Some air not necessary to cool the clutch may be by-passed out through ports 65 in housing 66 if desired or these ports may be omitted to exhaust exclusively through the clutch. An expansion chamber to further expand the air is formed adjacent to the clutch by the walls of the housing 66, clutch hammer 70 and end plate 42. From this chamber a portion of the exhaust air passes through the clutch in several ways. Part may pass through ports 90 to the transverse bore 71 into recess 73 through drilled hole 75 or through the liberal clearance between bolt 72 and bore 71 and out through hole 81 in anvil and a series of holes 91 in housing 66 lubricating and cooling the bolt 72 and the impact surfaces 82. Or part of the exhaust air can pass through ports 90 into the chamber adjacent to the thrust bearing confined by the end of the main bore of anvil 80 and the end of hammer 70, then through hole 92 and out through hole in housing 66 through which the square driver 80 passes or out through 93. This cools the far end of the clutch and the thrust bearing. Since end pressure is applied by the operator when the tool is in use and thrust ball 77 is under load, there is sufficient clearance between the end of the anvil 80 and the outer flanges of housing 66 to allow exhaust air to pass. Hole 92 also functions to bleed the said chamber about the thrust ball 77 to prevent the exhaust air from producing an undue thrust on ball 77. Also another hole 93 functions to bleed air at all times from between the anvil and the end flange of housing 66.

Between the clutch housing bore and the anvil which is very loosely journaled therein is an abundant clearance such as .005 to .010 to allow for lubrication and the passage of exhaust air. Note also that the eccentric clutch balancing relief 95 aids in holding and passing lubricant and air. Also the hammer 70 is loosely journaled in the anvil 80 to allow for the passage of lubricated air. This cools and lubricates the bearing surfaces mentioned by the exhaust air from the motor.

All these clearances pass exhaust air between adjacent walls and thereby form means for cooling and lubricating the clutch parts by the air from the motor exhaust.

One of the problems which I had to overcome in my high speed clutch was to make the elongated hole 81 as short as possible so as to weaken the anvil 80 as little as possible and yet to allow sufficient time to ensure the full engagement of bolt 72 and of surfaces 82. For example, if at the impact instant hammer 70 is turning at the rate of 4000 R. P. M. and the length of hole 81 less the diameter of bolt 72 was 60 degrees, then the bolt 72 must accomplish its movement to fully engage in 1/400 of a second. To expedite this movement I pass exhaust air still under compression through port 90 to a point behind bolt 72 and a plurality of holes 91 are provided to relieve air pressure in front of bolt 72. In showing holes such as 75 and the part of ports 90 nearest to hole 93 which exhaust recess 73 and the space behind bolt 72, I include in my invention the plugging or elimination of these ports as well as ports 65 to increase the compressed air pressure behind bolt 72.

I do not limit the field of my invention to the embodiment shown herein which was selected to provide an example only, nor do I necessarily limit it to the proportions shown or to the sizes or embodiments suggested by the technical data herein used for explanation or to the port sizes shown and in fact as herein stated. Some of said ports may be closed completely or altered in position or indexing within the scope of this invention.

I claim:

1. In a rotational impact producing tool, in combination with a pneumatic rotary motor, an intermittent clutch having internal impact surfaces and parts driven by said motor, a bearing supporting partition separating the vicinity of the motor from the vicinity of the clutch, an exhaust means from said motor exhausting air therefrom through said partition still under compression, passageway means to direct said exhaust air into the intermittent clutch and to further expand said exhaust air therein to cool said internal impact surfaces and parts.

2. In a rotational impact producing tool in combination with a pneumatic rotary motor, a compressed air inlet therefor, means to lubricate the compressed air, rotational impact producing clutch parts including a hollow anvil member, a hollow intermediate member and a hollow hammer member, of an exhaust means arranged to exhaust air from said motor through the hollows of said members to cool and lubricate the clutch parts.

3. In an intermittent rotary impact clutch the combination of a revoluble hammer having an aperture passing transversely and only partially therethrough, a bolt mounted therein for rectilinear movement longitudinally of said aperture under centrifugal forces, an anvil having a cylindrical wall surrounding the revolvable hammer, obstacle means in said cylindrical wall to engage the bolt as a result of the movement under said centrifugal forces.

4. In an intermittent rotary impact clutch, the combination of a revolvable hammer, a bolt mounted therein for movement incident to centrifugal forces, an anvil having a wall partially surrounding the hammer with an aperture in said wall to receive said bolt, one wall of said aperture forming an impact surface for said bolt when the hammer revolves and the bolt moves incident to the centrifugal forces and a member around said anvil to limit the movement of said bolt through said aperture under said forces.

5. In an intermittent rotary impact tool, the combination with a pneumatic motor, a hammer revolved thereby having the walls substantially enclosing an aperture therein except in one end of the aperture, a bolt mounted for movement in the aperture in and out of the open end, an anvil having an abutment adjacent to the hammer to provide a striking surface when the bolt moves into engagement therewith while being operated by the motor, a compressed air inlet into said motor, of means to direct air under pressure to behind said bolt to expedite its movement into engagement with said abutment.

6. In an impact tool according to claim 5 in which added to the combination is passageway means to allow said air to pass adjacent to said bolt to lower the operating temperature thereof at the striking surface.

7. In an impact tool according to claim 5 in which added to combination is, means to lubricate the air and means to allow said air to pass adjacent to said bolt to lubricate the operative surfaces thereof.

8. In an intermittent rotary impact tool, the combination with a revolvable hammer having walls enclosing a recess open at one end, an anvil having an abutment in alignment with the opening of said recess, of a bolt mounted in said recess for movement therein to engage said abutment, said bolt being hollowed out on its interior end to move its center of gyration away from the axis of revolution of the hammer to effect engagement with the abutment under centrifugal forces.

9. In an intermittent rotary impact tool the combination with a revolvable hammer member having walls defining a recess open at one end, an anvil member having an abutment in alignment with the opening of said recess, of an intermediate member inserted loosely in said recess for movement therein to engage said abutment, said intermediate member being lightened on one end to place its center of gyration away from the axis of rotation of the hammer to effect engagement with the abutment under centrifugal forces when the hammer revolves.

10. In a rotational impact producing tool having a housing, the combination of a pneumatic rotary motor disposed in one end of the housing, an intermittent clutch having impact surfaces and parts disposed in the other end of the housing and driven by said motor, a bearing support for the motor and the clutch carried by the housing and disposed between the motor end and the clutch end thereof, and a source of lubricated air for driving and lubricating the motor, said lubricated air being conveyed to the clutch end of the housing for lubricating and cooling said clutch surfaces and parts.

11. In a rotational impact producing tool, the combination of a pneumatic rotary motor, an intermittent clutch having impact surfaces and parts driven by said motor, a bearing supporting partition separating the vicinity of the motor from the vicinity of the clutch, an exhaust means exhausting air from said motor vicinity into the vicinity of the clutch to cool therewith the said impact surfaces and parts thereof.

12. In an intermittent rotary clutch to effect impact blows in combination with a pneumatic motor and a source of lubricated air to power the motor, the combination of clutch parts mounted for rotation by said motor including, a revolvable hammer, an anvil, an intermediate member mounted in said hammer for rectilinear bodily movement under centrifugal forces to engage said anvil, a cam striking surface between said intermediate member and said anvil acting to move said intermediate member to disengage the anvil, and means to direct said lubricated air to cool and lubricate said clutch parts.

WILLIAM M. EMERY.